A. A. CROZIER.
ELASTIC TIRE.
APPLICATION FILED APR. 23, 1918.

1,323,160.

Patented Nov. 25, 1919.

Inventor.
A. A. Crozier.
by Wilkinson & Giusta.
Attorneys.

UNITED STATES PATENT OFFICE.

ARTHUR ALEXANDER CROZIER, OF LONDON, ENGLAND.

ELASTIC TIRE.

1,323,160.  Specification of Letters Patent.  Patented Nov. 25, 1919.

Application filed April 23, 1918. Serial No. 230,268.

*To all whom it may concern:*

Be it known that I, ARTHUR ALEXANDER CROZIER, a subject of the King of Great Britain, residing at London, S. E., England, have invented certain new and useful Improvements in Elastic Tires; and I do hereby declare the following to be a full, clear, and exact description of the invention, such as will enable others skilled in the art to which it appertains to make and use the same.

This invention relates to improvements in resilient tires for the wheels of motor cars and other vehicles.

The invention is illustrated by the accompanying drawings in which:—

Figure 1:
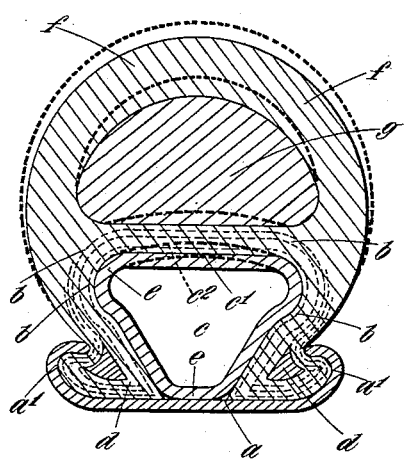
Figure 1 represents a cross section of the improved tire fitted to an ordinary standard pneumatic tire rim, the solid lines representing the normal form of the tire before the air chamber is inflated with air under pressure, and the heavy dotted lines representing the form into which the tire will be converted when the air chamber is inflated with air under pressure and ready for use.
Figure 2:
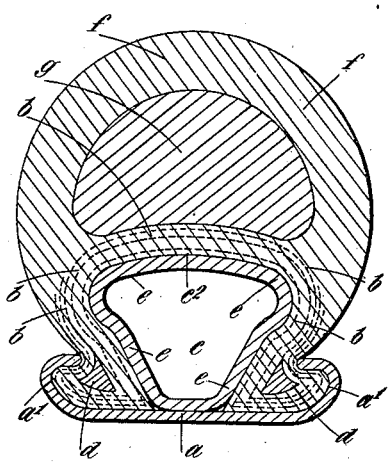
Fig. 2 represents a cross section of the improved tire showing the air chamber inflated and the tire ready for use which is the form represented in heavy dotted lines in Fig. 1.

In carrying the invention into effect according to the construction represented in Figs. 1 and 2, a tire is formed of caoutchouc or other suitable material in two parts which parts are united together in one mass and may be of the ordinary round formation in cross section and of any suitable diameter in cross section, the lower part near or adjacent to the rim $a$, of the wheel being made inextensible, or approximately inextensible by means of a series of layers of canvas or fabric $b$, or other inextensible or partially extensible material and consisting of a hollow or arched open annular cavity $c$, having inextensible beads $d$, or wires or the like on the edges thereof which are adapted to fit into grooves $a'$, of a corresponding shape on the flanges of the rim $a$, of the wheel. Said open annular cavity $c$, being constructed of a flattened form in cross section in or about the crown $c'$, (Fig. 1) thereof so that it is out of the true circle in cross section in its normal form or when not inflated, and adapted to receive an annular tube $e$, for containing air under pressure, so that when said annular tube $e$, is charged with air or other fluid under pressure it will cause said inextensible beads $d$, or the like to engage with the corresponding grooves $a'$, in the rim $a$, of the wheel in the same manner as an ordinary pneumatic tire, but the compressed air will also force the flattened or distorted form of the crown $c'$, (Fig. 1) of said annular cavity $c$, into a circular form $c^2$, as represented in Fig. 2, and by the heavy dotted lines $c^2$, in Fig. 1, or into a true circle, or approximately true circle in cross section for the purpose hereinafter described.

It is essential that the walls surrounding the annular chamber $c$ should be sufficiently flexible, and therefore the reinforcing material should not be so stiff as to prevent the walls from bending under pressure.

The upper part of the tire comprising the tread and part of the sides and the core or cushion part is made extensible and contains no air or other fluid under pressure and consists of a cover $f$, of plain vulcanized caoutchouc inclosing an annular elastic core $g$ of softer vulcanized caoutchouc than the outer cover $f$, and said soft core $g$ may be made in the form of an endless ring of a crescent shape in cross section as illustrated, or of a round, flattened, or other suitable shape in cross section and smaller in circumference than the circumference of the outer periphery of the crown of said hollow open annular cavity $c$, when in its normal state or when it is inflated with air under pressure and over which said soft core $g$, is stretched so that it will be continuously in a state of circumferential tension or strain and thus contain or have stored therein a great amount of energy or "life" at all times around the outer periphery of the crown of said hollow open annular cavity $c$, whether the tube $e$, be inflated or not and such energy or "life" will be imparted to the whole of the tire.

The outer cover $f$, of caoutchouc is then formed or built up over or around the soft core $g$, which may be in a partially vulcanized state before the outer cover $f$, is formed over same and said outer cover $f$, may be composed of a quick curing rubber or mixture, and the soft rubber core $g$, may be composed of a slow curing rubber or mixture and the curing or vulcanization may be completed before it is placed under tension or strain.

Said soft rubber core $g$, may prior to being stretched around the outer periphery of the crown $c'$, of said hollow open annular cavity $c$, be made adhesive by being coated with rubber solution with sufficient sulfur to effect the vulcanization of the rubber contained in the solution, and the solvent should be evaporated before the soft rubber core $g$, is stretched around the outer periphery of the crown $c'$, of said hollow open annular cavity $c$, and the soft core $g$, will be in a condition to withstand a vulcanizing heat without any substantial loss of strain, tension or energy which has previously been imparted to it by being stretched over a circumference greater than its own inner circumference.

It will be seen that when the said tube $e$, is inflated with air or other fluid under pressure it forces itself against the inner periphery of the crown $c'$, of said hollow annular cavity $c$, and causes it to assume a circular formation or curve, or a true circle or approximately true circle according to the form of the air cavity $c$, in its normal form before it is inflated, which imparts a continuous transverse outward curving pressure against the under or inner periphery of said soft rubber core $g$, while the tire is inflated only, and in a radial direction from the axis of the wheel and causes the core $g$, to curve transversely and creates a curving transverse tension more or less according to the pressure of air in the tube $e$, and said soft rubber core $g$, is always under transverse curving tension or strain while the tire is inflated, in addition to and independent of the circumferential strain or tension, which circumferential strain or tension is always in the tire whether it is inflated or not, whereby the soft core $g$, will have two forces or tensions imparted to it each different from the other, and will thus give what I might call "vitality" to the tire, or impart or store in the tire two kinds of energy which will render the complete tire very resilient and prevent it permanently flattening in the tread thereof when it is in one position for a length of time and supporting a heavy vehicle or load.

When the tire is inflated the outer circumference thereof is increased more or less according to the pressure of air in the tire and the increase of circumference is caused by the outward curve of the crown $c'$, $c^2$, $c^3$, $c^4$, of the air cavity $c$, whereby the circumferential strain or tension will be increased more or less according to the air pressure in the tire and this additional circumferential strain or tension is independent of the circumferential strain or tension imparted to the soft core $g$, when it is stretched around the outer periphery of the crown $c'$, of said hollow open annular cavity $c$, during the manufacture of the tire, or said soft core $g$, may be made with its inner circumference of the same circumference or approximately of the same circumference as the circumference of the outer periphery of the crown of said hollow annular cavity $c$, when in its normal state and when the tire is not inflated, and in this case the soft core $g$, would not be under circumferential tension or strain until the tire is inflated with air under pressure and would entirely depend upon the compressed air in the tube $e$, for its circumferential tension or strain besides the said continuous transverse outward curving pressure which creates a curving transverse tension or strain to the core $g$, so that when the tire is constructed in this manner both the circumferential and transverse tensions or strains do not exist in the core $g$, until the tube $e$, is inflated.

Figure 3:
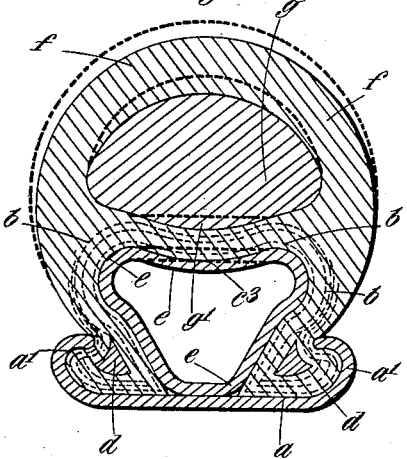
Fig. 3 represents a cross section of a modified form of the improved tire, the solid lines representing the normal form of the tire before the air chamber is inflated and the heavy dotted lines representing the form into which the tire will be converted when the air chamber is inflated and the tire is ready for use.

I wish it to be understood that I do not limit myself to the form of the compressed air cavity $c$, or to the form of the soft rubber core $g$, as hereinbefore described and illustrated in the drawings as the tension or strain may be imparted to the tire and the soft rubber core $g$, by means of various forms of air cavities or various forms of soft rubber cores, for instance as represented in Fig. 3, the inner periphery of the crown of the air cavity $c$, may be made convex $c^3$, and the base of the soft rubber core $g$, may also be made convex $g'$, and when the tire is inflated the air will cause the convex crown $c^3$, to flatten or curve in an outward direction more or less according to the pressure of the air in the tube $e$, and force the convex base $g'$, of the soft rubber core $g$, in an outward direction from the axis of the wheel and impart the desired tension or strain to the tire. The heavy dotted lines represent the form the tire will take when inflated, or approximate form, according to the pressure of air in the tire.

Figure 4:
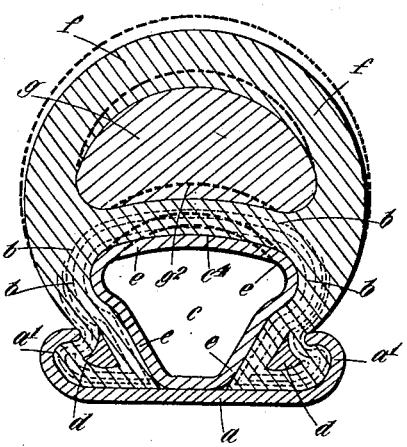
Fig. 4 represents a cross section of another modified form of the improved tire, the solid lines representing the normal form of the tire before the air chamber is inflated, and the heavy dotted lines representing the form into which the tire will be converted when the air chamber is inflated.

In a further modification as represented in Fig. 4, the inner periphery of the crown of the air chamber $c$, may be made concave $c^4$, and the base of the soft rubber core $g$, may also be made concave $g^2$, and when the tire is inflated the pressure of the air will cause the concave crown $c^4$, to become more concave or assume a more circular form according to the pressure of the air in the tube $e$, and force the concave base $g^2$, of the soft rubber core $g$, in an outward direction from the axis of the wheel and cause the concave base $g^2$, to become more concave or assume a more circular form which will impart the desired tension or strain to the tire. The heavy dotted lines represent the form the tire will take when inflated, or the approximate form according to the pressure of air in the tube $e$.

When said annular tube $e$, is charged or inflated with air under great pressure, or a pressure that may be excessive for all ordinary purposes, or when the layers of canvas or fabric $b$, are somewhat flexible, or when a small number of layers of canvas or fabric are employed it may tend to cause the walls or sides of said annular arched cavity $c$, to straighten slightly and in such case said walls may be made slightly convex on the outer surfaces at such parts so as to project slightly at such convex parts beyond the ordinary normal circular formation in cross section of the said walls whereby the walls will be caused to present a true rounded formation on the outer surfaces when the tube $e$, is charged with air under great pressure and thus compensate for the slight straightening of the walls.

The tube $e$, may be made of an ordinary round formation in cross section as it will accommodate itself to the shape of the air cavity $c$, when inflated, or it may be made of the same shape in cross section as the shape of the air cavity $c$.

Like reference letters indicate like parts wherever they are repeated on the drawings.

What I claim as my invention and desire to secure by Letters Patent is:—

A resilient tire for wheels, comprising an elastic casing provided with an inner and an outer annular chamber, the said chambers being concentric and separated from each other by a web integral with said casing, the outer wall of the outer chamber being substantially arched in cross section, and the web separating the two chambers and also the side walls of the inner chamber being reinforced with flexible fabric, a solid soft rubber core of substantially semi-circular cross section inserted under tension in and filling said outer chamber, and pressing said web inward, and a pneumatic tube mounted in said inner chamber and adapted when inflated to force said web outward against the action of said rubber core, and thus to place all the outer portions of the tire under compression outward, substantially as and for the purposes described.

In testimony whereof I affix my signature.

ARTHUR ALEXANDER CROZIER.